116,044

UNITED STATES PATENT OFFICE.

CHARLES H. FRINGS, OF CENTRETON, MISSOURI, ASSIGNOR TO HIMSELF AND CHARLES BRACHES, OF SAME PLACE.

IMPROVEMENT IN PREVENTING WASTE OF ALCOHOL IN FERMENTING-TANKS.

Specification forming part of Letters Patent No. 116,044, dated June 20, 1871; antedated June 10, 1871.

*To all whom it may concern:*

Be it known that I, CHARLES H. FRINGS, of Centreton, in the county of St. Louis and State of Missouri, have invented a new and Improved Mode of Preventing Evaporation in Distilleries; and I do hereby declare that the following is a full, clear, and exact description of the same.

The purpose of my invention is to prevent the waste by evaporation in distillery-tubes; and the means which I employ to carry out this purpose consist in a water-proof flexible cloth, perforated at intervals, combined with a membranous covering applied thereto, as hereinafter described. The loss alluded to amounts generally to about ten per cent. of the alcohol. Wooden covers have been heretofore employed to remedy it, but with very little success.

I first select any water-proof and flexible material and bring it into proper shape for the vessel for which it is intended. I then perforate it at intervals and lay it over the vessel. I next take a bladder or other substance which possesses the porosity required to allow the carbonic-acid gas to pass therethrough, but which will arrest alcoholic vapors, and apply this latter over these perforations.

It is a well-known fact that in the fermentation of mashes in open vats there occurs an evaporation of alcohol proportional to the intensity of the evolution of carbonic-acid gas. This happens on the most extensive scale with grain mashes, which offer a very large evaporating-surface. Now I avail myself of the peculiar property of certain membranes to retain the alcohol while freely transmitting other gases, especially carbonic acid, in the following manner: The fermenting-vessel is covered by a water-tight material stretched over a light frame and closing elastically over the edges of the vessels. This cover is provided with orifices varying in size and number, according to the dimensions of the fermenting-vessel, which orifices are closed tightly by means of membranes permeable for carbonic-acid gas, but impermeable to alcoholic vapors. Foremost among such membranes is moistened animal bladder, prepared as follows: After being thoroughly freed from all impurities it is soaked for a couple of hours in glycerine and then pressed between sheets of dry filtering or blotting-paper. By virtue of its hygroscopic properties glycerine maintains the bladder in the proper condition of moisture, while not interfering in the least with the effectiveness of the membrane. The exterior surface of the bladder is turned upward on the cover of the fermenting-vessels. One square foot of bladder-surface for one thousand gallons of mash is quite sufficient. As soon as fermentation sets in the bladder will bulge upward to some extent, transmitting the carbonic acid, while retaining the alcoholic vapors.

The fact that moistened bladder is impermeable to alcohol, whether in the liquid or gaseous form, was discovered long ago by Semmering, while the ready permeability of animal membrane to carbonic acid is a fact stated in Silliman's "First Principles of Chemistry," under the head of "The passage of gases through moist membranes."

In general all membranes, of whatever kind, must be considered in the light of filters impermeable to all bodies whose molecules are larger than the pores of the membrane.

Now the atomic or molecular weights not only determine the magnitude of the molecules themselves, but also the greater or lesser complexity, and the power of attraction exerted upon each other by the atoms composing the molecules. According to this law, laid down in Traube's "Investigations on Homogeneous Membranes," membranes of the most diversified efficiency may be produced.

Having thus described all that is necessary to a full understanding of my invention, what I esteem to be new, and desire to protect by Letters Patent, is—

In combination with the grain-mash tubs of distilleries, a water-proof, flexible, and perforated cover of an animal bladder moistened, as and for the purpose described.

CHAS. H. FRINGS.

Witnesses:
 LOUIS WILLICH,
 T. C. HILGARD, M. D.